March 4, 1952  R. M. WITT  2,587,800
MOTOR VALVE AND POSITIONER APPARATUS
Filed April 22, 1947  3 Sheets-Sheet 1
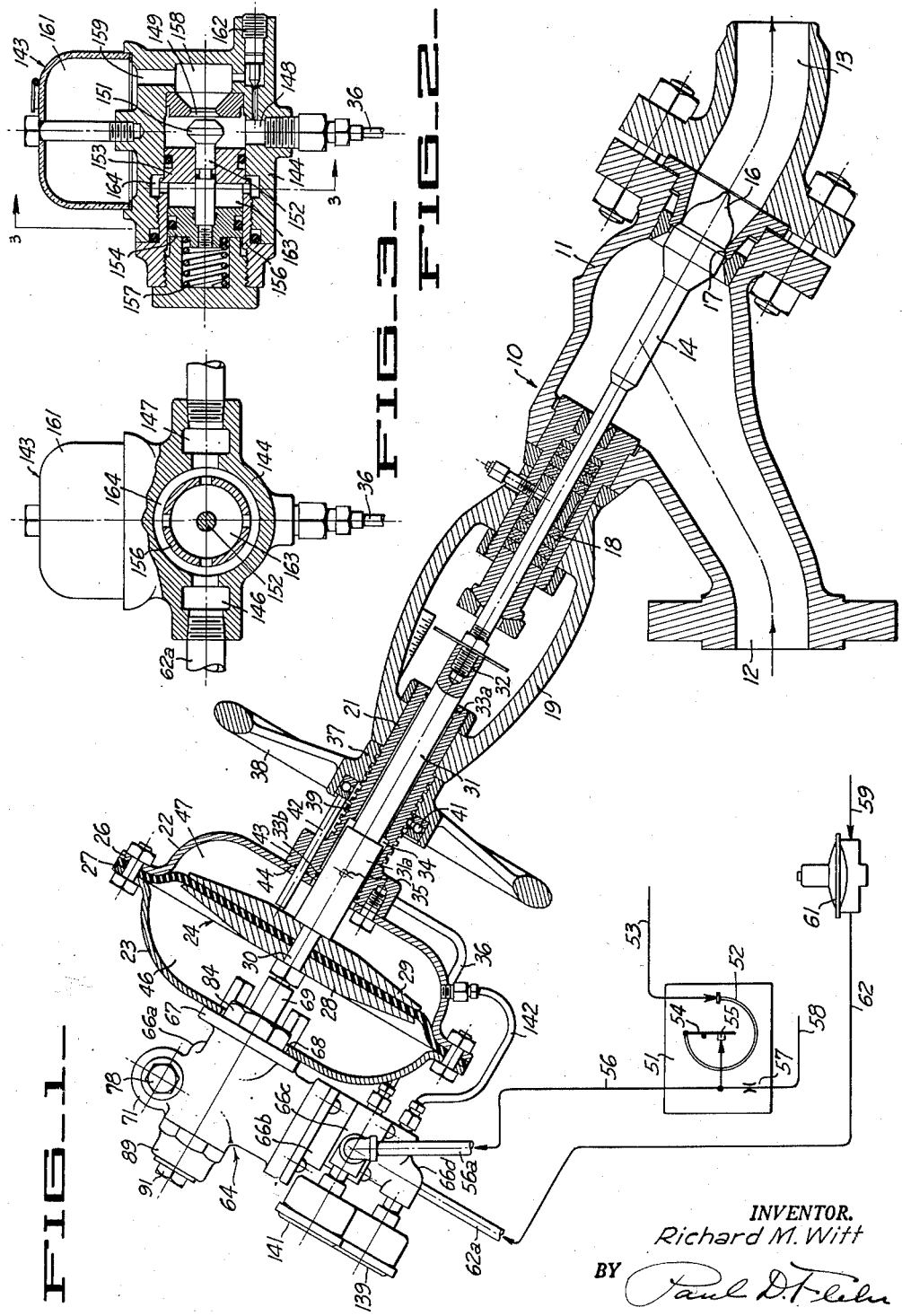
INVENTOR.
Richard M. Witt
BY 
ATTORNEY

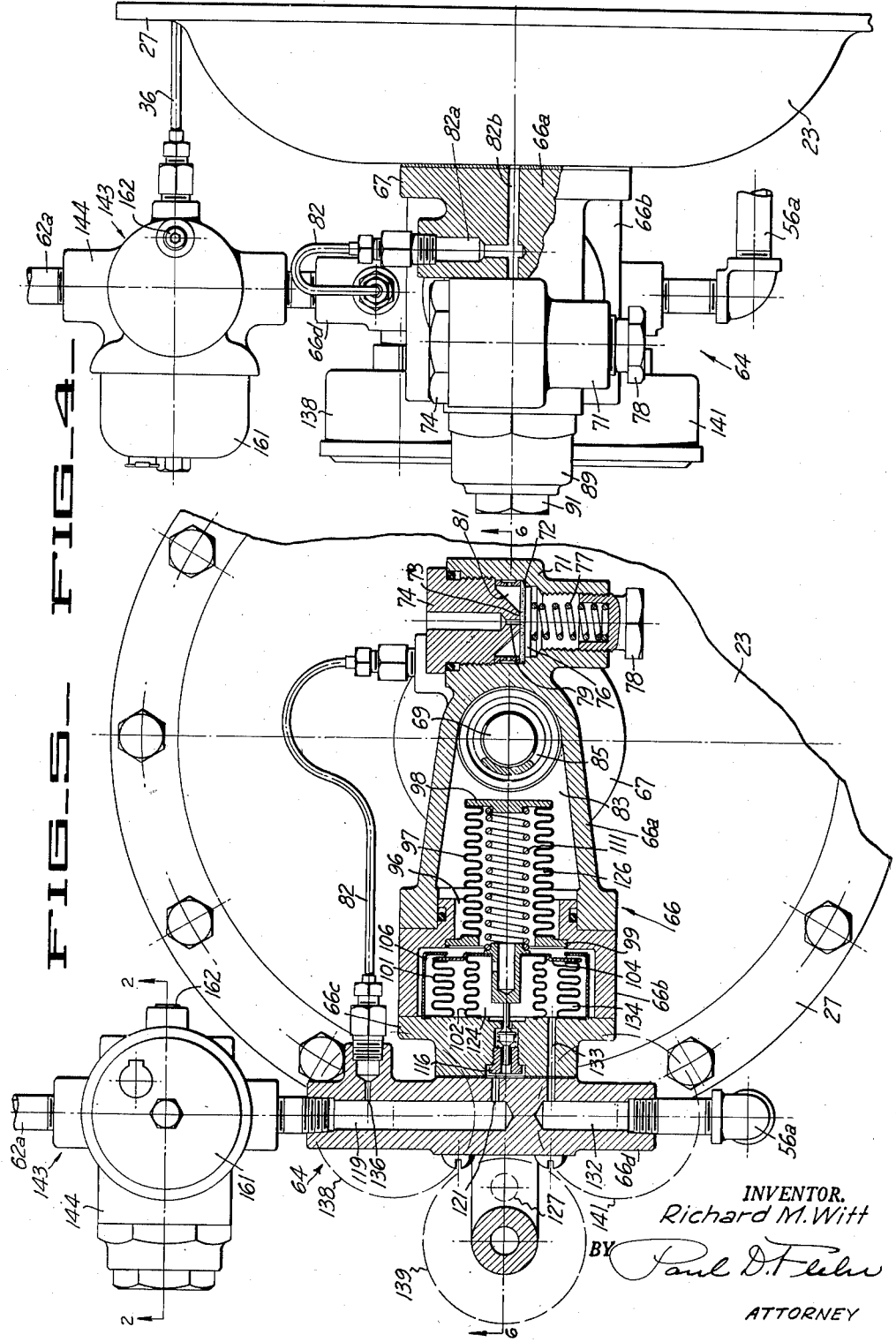

March 4, 1952 R. M. WITT 2,587,800
MOTOR VALVE AND POSITIONER APPARATUS
Filed April 22, 1947 3 Sheets-Sheet 3
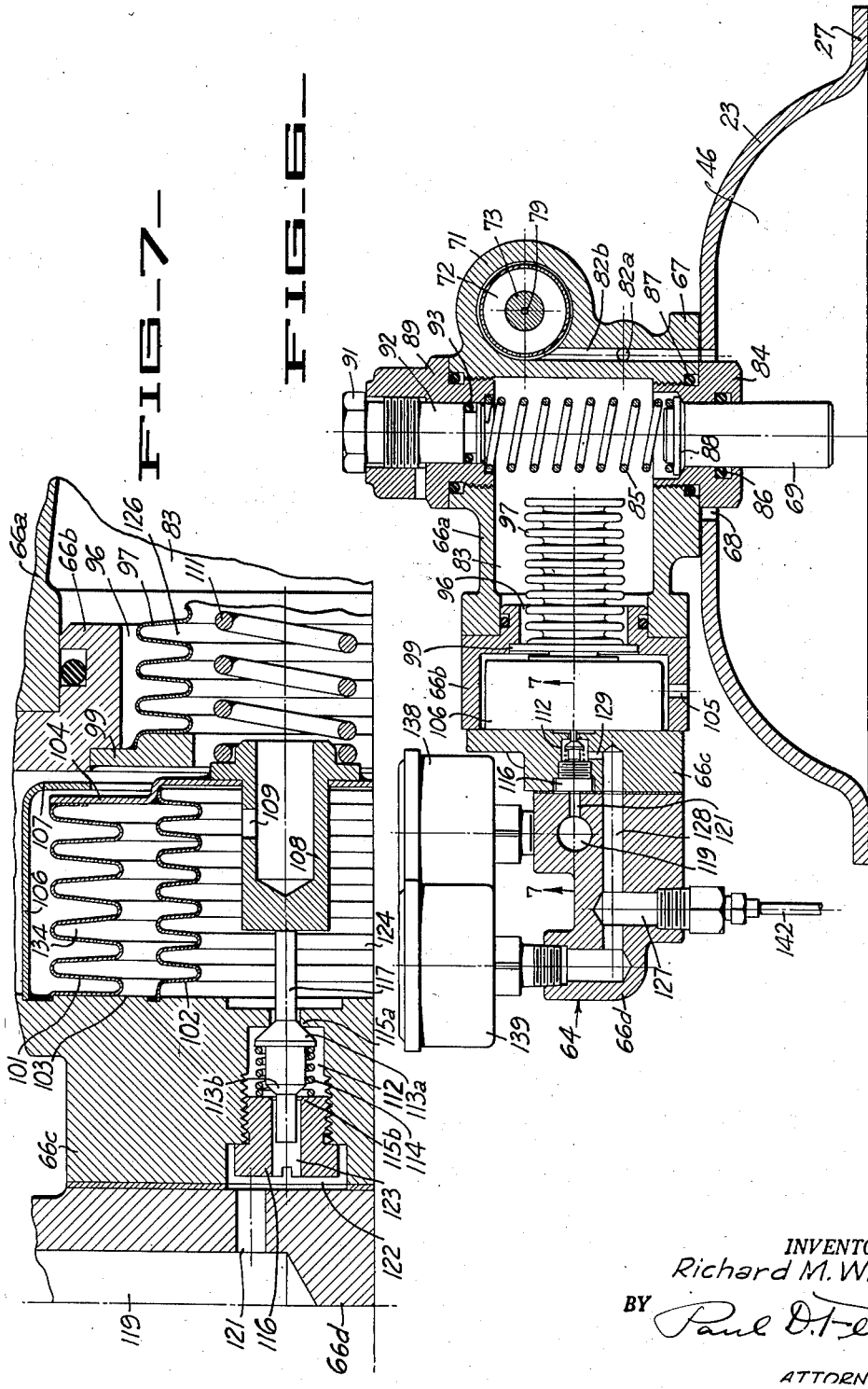
INVENTOR.
Richard M. Witt
BY
ATTORNEY Patented Mar. 4, 1952

2,587,800

UNITED STATES PATENT OFFICE 2,587,800

MOTOR VALVE AND POSITIONER APPARATUS

Richard M. Witt, Berkeley, Calif., assignor, by mesne assignments, to M & J Engineering Co., a partnership consisting of M. H. Grove and J. E. Grove, both of Piedmont, Calif.

Application April 22, 1947, Serial No. 743,107

3 Claims. (Cl. 137—153)

This invention relates generally to apparatus of the motor valve type, and particularly to such apparatus incorporating a so-called valve positioner capable of insuring predetermined incremental movement of the valve member responsive to given control variations.

Apparatus of the type described above is disclosed for example in Patents Reissue 20,092 and 2,312,201. Generally the motor valve employed is diaphragm or piston operated, and the controlling pressure utilized is generally pneumatic and is varied by the equipment or instrument with which the apparatus is being used. A so-called valve positioner is arranged to be responsive to the control pressure, and in turn serves to control application of air pressure to the operating chamber of the valve. The action of the positioner is modified by a direct mechanical connection to the operating rod of the valve, whereby the positioning of the valve is caused to be in predetermined increments responsive to given variations in the controlling pressure. In other words for a given value of controlling pressure, the valve is caused to assume a predetermined position.

Motor valve apparatus of the above type such as has been available to the industry in the past has been subject to a number of disadvantages. For example the mechanical connection between the pneumatic positioner and the operating rod of the valve is generally located between the diaphragm and the body of the valve, and the positioner itself is carried by a bracket and is disposed adjacent one side of the rod. Such an arrangement exposes the positioner and its mechanical connecting linkage to accidental injury, it tends to interfere with emergency manual operation, and it complicates making repairs of the valve seating surfaces and of the customary packing gland of the valve. In addition the mechanical connection involved generally utilizes a relatively complicated arrangement of links and levers, which cannot be adjusted as readily and with the same degree of practicability as the invention to be presently described.

It is an object of the present invention to provide apparatus of the type described above which avoids use of conventional types of mechanical connections between the valve operating rod and the pneumatic controlling device.

A further object of the invention is to provide apparatus of the above type in which the pneumatic positioning device is mounted upon the diaphragm casing.

A further object of the invention is to provide apparatus of the above character in which the pneumatic valve positioning device receives its modifying motion through hydraulic means, thereby avoiding the use of objectionable levers and links.

Another object of the invention is to provide valve apparatus which enables elimination of the customary loading spring for the main valve.

Additional objects of the invention will appear from the following description in which the preferred embodiment has been set forth in detail in conjunction with the accompanying drawing.

Referring to the drawing:

Figure 1 is a side elevational view in section illustrating motor valve apparatus incorporating the present invention.

Figure 2 is a side elevational view showing the hydraulic relief valve incorporated in the apparatus of Figure 1.

Figure 3 is a cross-sectional view taken along the line 3—3 of Figure 2.

Figure 4 is an enlarged detail showing the parts mounted upon the diaphragm casing, and partly in section.

Figure 5 is an end view of the parts as illustrated in Figure 4 and with third portions in section.

Figure 6 is a cross-sectional view taken along the line 6—6 of Figure 5.

Figure 7 is a cross-sectional detail on an enlarged scale taken along the line 7—7 of Figure 6.

Referring to Figure 1 the apparatus shown therein includes a motor operated valve 10, which consists of a valve body 11 having passages 12 and 13 for connection with associated piping. A valve rod 14 extends into the body and carries a valve member 16 adapted to cooperate with a stationary seat 17. A suitable packing gland 18 is provided to prevent leakage about stem 14. A yolk 19 is carried by the valve body and serves to carry the tube or sleeve 21. This sleeve in turn serves to mount a diaphragm casing consisting of the two casing parts 22 and 23. A diaphragm 24 is mounted within this casing and has its flexible peripheral edge portion clamped between the casing flanges 26 and 27.

The upper and lower plates 28 and 29 of the diaphragm assembly are clamped together by the stud 30, and thereby attached to the rod 31. The exterior end of this rod is attached, as by threaded connection 32, to the adjacent end of the valve stem 14. That portion 31a of the rod nearest the diaphragm is of enlarged diameter and forms a hydraulic plunger that will be presently described. Sleeve 21 is sealed with respect to the rod 31 by suitable means such as the O rings 33a and 33b. The bore 34 in which the plunger 31 is accommodated forms a hydraulic cylinder or chamber, which is in communication with a pipe 36 through duct 35.

The hub 37 of the hand wheel 38 is internally threaded to engage the threads 39 formed on the sleeve 21. The hub also carries a thrust bearing assembly 41 which engages adjacent ends of a plurality of thrust rods 42. These rods extend through the mounting flange 43 of the sleeve 21, for engagement with the diaphragm plate 29. Leakage about these rods is prevented by suitable means such as the O rings 44. It will be evident that by turning the hand wheel 38 rods 42 can be caused to move the diaphragm 24, thus manually moving the valve member 16 toward open position. In addition the hand wheel can be set for the purpose of limiting the movement of the valve member toward closed position.

A closed space 46 is formed on one side of the diaphragm 24 which is adapted to receive fluid under pressure. An additional space 47 is provided on the opposite side of the diaphragm, and this space is likewise adapted to receive fluid under pressure. As will be presently explained it is desirable to maintain a pressure in space 46 in order to provide a substantially constant loading force which urges the diaphragm and the stem of the valve in one direction, that is toward closed position in the particular assembly illustrated.

All of the apparatus described above has been disclosed in my co-pending application Serial No. 620,771, filed October 6, 1945. It should be understood that the more conventional types of motor valves can be used in conjunction with the present invention including valves provided with an operating diaphragm adapted to receive operating air under pressure, together with a compression spring for applying the desired loading forces, in place of pneumatic pressure as in the present instance.

In a typical installation such as illustrated in Figure 1 my invention is utilized in conjunction with a pneumatic control instrument 51. As illustrated diagrammatically such an instrument can consist for example of a Bourdon tube 52 which is connected to receive varying fluid pressure from line 53. This line may lead to a process or piece of equipment which is to be directly or indirectly controlled by operation of my apparatus. The Bourdon tube is shown operating a flapper valve 54, the valve orifice 55 of which is connected to the pneumatic line 56. This line in turn connects through the restricted orifice 57 with a source of air pressure represented by line 58.

Another source of air supply is indicated by line 59, and is shown being reduced to a desired constant pressure by the pressure reducing regulator 61. Line 62 represents the low pressure side of regulator 61.

Mounted upon the casing 23 there is an assembly 64 which incorporates what is commonly referred to as a valve positioner of the supply and waste type, together with means forming a hydraulic connection to the valve rod 31. The assembly 64 consists of a body formed of a plurality of separable sections 66a, 66b, 66c and 66d. Normally these parts of the body are clamped together by screws or like means, with suitable gaskets or other sealing means to prevent leakage. Body part 66a has a flange 67 for attachment to the casing part 23, and the casing is provided with an opening 68 whereby an operating plunger 69 to be presently described can extend into abutting engagement with the adjacent end of the stud 30.

Body section 66a also has a portion 71 which is bored as illustrated and which is fitted with a resilient diaphragm 72. One side of this diaphragm is adapted to contact and seal upon a stationary valve seat 73, carried by the removable plug 74. A diaphragm plate 76 engages the other side of the diaphragm, and seats one end of the compression spring 77. By adjusting the plug 78 the compression of spring 77 can be adjusted. The port 79 through the plug 74 is vented to the atmosphere. The space 81 immediately surrounding the seat 73 is in communication with an air supply pipe 82, by way of ducts 82a, 82b. The parts just described provide a small adjustable back pressure regulator, by means of which a desired substantially constant loading pressure can be maintained in chamber 46. As will be presently explained pipe 82 has restricted communication with a source of air under pressure, whereby a small amount of air is continuously supplied to the chamber 46, with continuous controlled venting to the atmosphere through the pressure relief valve.

Body section 66a forms a fluid chamber 83 adapted to contain a suitable liquid, such as oil, glycerin, glycol or the like. As shown in Figure 6 the member 69 is in the form of a cylindrical plunger slidably fitted within a sleeve 84 which in turn has threaded sealed engagement with the body part 66a. Suitable means such as a resilient O ring 86 prevents leakage between the plunger 69 and the sleeve 84, and the sleeve in turn is sealed with respect to the body by the O ring 87. The upper end of plunger 69 is provided with an enlarged flange or head 88, which seats the lower end of a compression spring 85. The upper end of this spring is seated upon a sleeve 89 which has threaded and sealed engagement with the body section 66a. A plug 91 is threaded within sleeve 89, and the lower or inner end of this plug is formed to provide a plunger 92 which is sealed with respect to the sleeve 89 by resilient O ring 93. Plug 91 can be adjusted for the purpose of adjusting the volumetric capacity of the space 83. In addition the plug can be removed in entirety for the purpose of introducing oil or like liquid.

The body sections 66b and 66c serve to mount a number of parts as follows: Body part 66b is provided with a central opening 96 which accommodates the Sylphon tube or like bellows 97. That end of the bellows which extends into chamber 83 is closed by plate 98, and the other end is mounted upon annulus 99, which in turn is attached to and sealed with respect to body 66b.

Within the body section 66b there are two Sylphons or like metal bellows 101 and 102. Corresponding ends of these bellows are attached to and sealed to the inner face 103 of the body section 66b, and the other ends are attached to and sealed with respect to an end plate 104. The space surrounding Sylphon 101 is vented to the atmosphere through port 105 (Figure 6). The body section also carries a shell 106 which surrounds the bellows 101, and which is provided with an inturned flange 107 serving to form a limiting stop for the plate 104.

The central portion of plate 104 also carries a stud 108 which is provided with a port 109 for free communication through the same. A compression spring 111 has one end of the same seated upon the stud 108, and its other end seated upon the end plate 98 of Sylphon 97.

Body section 66c is provided with a bore 112 to accommodate the valve members 113a and 113b. Compression spring 114 urges these valve members in one direction, and the force exerted by the spring can be varied by adjusting the threaded plug 116. The valve stem 117 extends from the valve members 113a and 113b, and is adapted to abut the adjacent end face of the stud 108. Valve members 113a, 113b cooperate with the stationary seats 115a, 115b.

Body section 66d is provided with an air supply passage 119 (Figures 6 and 7) which is in communication with the orifice of seat 115b by way of ducts 121, space 122 and duct 123. When both the valve members 113a and 113b are in partially open position there is further communication through valve seat 115a with space 124 within the Sylphon 102, and space 126 within the Sylphon 97.

Body section 66d (Figure 6) is also provided with a passage 127 which is in communication by way of ducts 128 and 129 with the space 112 between the valve seats 115a and 115b. Body section 66d is provided with another passage 132 (Figure 5) which in turn is in communication with the space 134 between the Sylphons 101 and 102 by way of duct 133. The air supply passage 119 in the body section 66d is also in communication with pipe 82 by way of the restricted orifice 136.

Mounted upon the body section 66d are the pressure gauges 138, 139 and 141. Gauge 138 communicates with passage 119 and therefore indicates the pressure of the air being supplied. Gauge 139 communciates with passage 127, and thus indicates the pressure in space 112 between the valve members 113a and 113b. Gauge 141 communicates with passage 132 and therefore indicates the value of the applied instrument pressure. Pipe 56a connects with the passage 132 and corresponds to the line 56 of Figure 1. Pipe 62a connects with the passage 119 (through device 143) and corresponds to the line 62 of Figure 1. A pipe 142 connects passage 127 with the chamber 47 below the diaphragm (Figure 1).

Before explaining the mode of operation of the assembly 64 reference will be made to the fluid operated shut-off valve 143 which is incorporated in line 62a. Referring to Figures 2 and 3 this device consists of a body 144 provided with passages 146, 147. Passage 146 connects with pipe 62a, and the other passage 147 connects directly to the passage 119 of body section 66d (Figure 5).

Within the valve body there is a stationary valve seat 149 cooperating with the movable valve member 151. The valve member is carried by a stem 152 which extends slidably through the guide member 153. A piston 154 is attached to the stem 152 and operates within the cylinder sleeve 156. Compression spring 157 urges the piston 154 toward the right as viewed in Figure 2, or in other words it urges the valve member 151 toward its seat. One side of the valve seat 149 is connected by space 158 and duct 159 with a liquid supply reservoir 161. The other side of the seat is in free communication with the passage 148 and pipe 36. A small by-pass valve 162 is shown connected between space 158 and passage 148, and can be operated manually. The air space 163 on one side of the piston 154 is in free communication by way of duct 164, with the passages 146 and 147 and the piping connected to the same. It is therefore evident that as long as operating line pressure is applied to passages 146, 147, the valve member 151 is held in open position against the force of spring 157. However when this supply of pressure fails, spring 157 forces the valve member to closed position. Pipe 36 connects with passage 148, and as previously explained this pipe leads to the hydraulic chamber 34 of the diaphragm motor valve (Figure 1).

Operation of the complete apparatus described above can be explained as follows: Assuming a typical installation the housing 11 of the motor valve is connected with associated piping for controlling the flow of a gas or liquid. The instrument pressure applied by way of line 53 is arranged to vary in accordance with the variations in some industrial process or operation with which the apparatus is being used. For example the pressure may vary in accordance with the temperature of a furnace or oven. Depending upon variations in pressure applied to line 53, the flapper valve 54 assumes a corresponding position to produce a controlled amount of venting from its orifice 55. This in turn serves to determine the pressure in line 56, whereby such pressure is applied to the valve positioner of the assembly 64. It will be noted in this connection that the Bourdon tube arrangement 51 acts in effect as a pneumatic booster, to produce amplified pressure variations in response to variations applied by way of line 53. In some instances such a booster arrangement can be omitted, and the controlling pressure variations applied directly to the valve positioner by way of line 56. For a given pressure applied by way of line 56 a pneumatic pressure is applied to chamber 47 below the diaphragm, such as will serve to maintain this diaphragm and valve member 16 in a given position. To maintain a given position it will be evident that the pressure in space 47 must be capable of balancing the constant loading pressure in chamber 46, plus any additional force applied to the valve member 16 by the line fluid being handled. For a given positioning of the diaphragm the plunger 69 also takes the given position, and since the space 93 of the body section 66a is completely filled with liquid, Sylphon 97 is held compressed a given corresponding amount whereby compression spring 111 applies a given amount of force to the plate 104 of the assembly including Sylphons 101 and 102.

For a balanced condition as previously mentioned valve members 113a and 113b of the valve positioner both assume a partially open position, with the result that air supplied at a substantially constant pressure by way of line 62 (Figures 1 and 7) passes through duct 121, space 122, duct 123, and through the valve seat 115b. Controlled venting of this air occurs through the valve seat 115a, to maintain a pressure in space 112 which is applied to the space 47 below the diaphragm through pipe 142. Assuming now that the pressure applied through line 53 is increased by a given amount, a corresponding increase in pressure occurs in pipe 56, and this pressure is transmitted through passage 132, duct 133, to the space 134 between Sylphons 101 and 102. As a result the end plate 104 is moved to the right a slight amount whereby some opening movement of valve member 113b occurs, whereas valve member 113a moves toward its stationary seat. Opening of the valve member 113b permits on increased amount of air to flow into the space 112, while closing movement of valve member 113a decreases the rate with which gas is being vented from space 112 to the atmosphere. Therefore a substantial increase in pressure occurs in space 112, and this pressure increase is transmitted through ducts 129, 128 passage 127, and pipe 142, to the space 47 below the main diaphragm. As a result of application of increased pressure to space 47 the diaphragm is displaced to move the main valve 16 towards its full open position. Plunger 69 moves in unison with the main diaphragm, and by virtue of the displacement of oil which occurs in space 83 (Figure 6) Sylphon 97 is compressed an increased amount whereby the force applied by pressure spring 111 is increased. Shortly after the increased pressure has been applied through instrument line 53, the valve positioner will come to a new position of equilibrium, in which the forces applied to the end plate 104 will be balanced, and in which the valve members 113a and 113b will occupy positions to maintain a pressure in space 112 which will suffice to maintain a corresponding pressure in space 47 below the main diaphragm to maintain this diaphragm in the new position.

It will be evident from the foregoing that when the instrument pressure falls a given amount, the action upon the valve positioner is such that the pressure in space 47 below the diaphragm is caused to fall whereby the diaphragm and the main valve assume a new corresponding position. Here again a condition of equilibrium is established whereby the new position of the valve member corresponds to the new instrument pressure.

During normal operation as described above the back pressure reducing regulator functions to maintain a substantially constant loading pressure in the space 46 above the diaphragm. As previously explained this loading pressure takes the place of a relatively heavy loading spring such as is used on conventional types of diaphragm motor valves.

In the event there is a failure of the air supply, the device illustrated in Figures 2 and 3 functions to lock the main valve in the position which it occupied at the time of failure. Normally the air pressure supplied by pipe 62 retains the piston 154 to the left as viewed in Figure 2, with the valve member 151 open. Thus oil or like liquid within the chamber 34 of the motor valve is free to surge through the line 36 into the reservoir 161, when the main valve is being moved between its limiting positions. When there is a failure of air supply piston 154 is free to move to the right as viewed in Figure 2, and as a result valve 151 is closed upon its seat to prevent further flow of oil through line 36. The oil is thereby trapped in chamber 34, so that the valve rod 31 is hydraulically locked in the position which it occupied at the time the valve 151 moved to closed position. If after valve 151 has moved to closed position, it is desired to effect manual movement of the main valve from the position in which it is locked, needle valve 162 is opened manually to permit the liquid to bypass valve member 151. After needle valve 162 has been opened it is possible for the operator to manually operate the main valve by turning the hand wheel 38. Likewise if desired this hand wheel can be set during normal operation of the apparatus for the purpose of limiting movement of the main valve towards closed position.

My apparatus is relatively flexible in that it can be adjusted to operate over a wide variety of positions. For example the plunger 92 can be adjusted by turning the plug 91, whereby the amount of compression of the Sylphon 97 for a given positioning of the plunger 69 can be varied. This serves in effect to change the location of the main valve for a given value of instrument pressure. Another adjustment can be had by removing the sleeve 84 together with plunger 69, and applying another assembly utilizing a plunger of different cross-sectional fluid area. Such changes enable adjustment of the apparatus to adopt the same to different ranges of instrument pressure.

The hydraulic means utilized for transmitting motion from the main valve to the pneumatic valve positioner is relatively accurate compared to mechanical devices which have been used in the past. For all positions of the main valve a given incremental movement will result in a corresponding incremental movement of the Sylphon 97. Generally this is not the case with mechanical motion applying mechanisms where the angularity of links or levers for extreme positions of the main valve, serves to introduce errors.

Mounting of the assembly 64 upon the diaphragm casing is a distinct advantage over prior apparatus, particularly in that the space between the diaphragh casing and the body of the main valve is left free to facilitate manual operation, and to avoid accidental injury to the positioner and its associated motion applying means. When located upon the top of the casing in the manner described the entire assembly 64 can be readily removed for repair or replacement.

I claim:

1. In equipment of the character described, a fluid pressure operated diaphragm movable in opposite directions, a main valve comprising a valve body and a valve member, means forming a connection between the valve member and the diaphragm, a casing serving to mount the diaphragm and forming a chamber on one side of the same adapted to receive fluid under pressure to effect the positioning of the diaphragm, and means serving to control application of air pressure to said chamber to effect predetermined incremental positioning of said diaphragm in response to given values of controlling pressure, said means comprising a pneumatic valve device of the supply and waste type serving to control application of air to said chamber, a spring serving to apply forces to said device, a metal bellows serving to apply force to said spring, a body forming a closed liquid chamber which encloses the exterior of said metal bellows, said body being mounted upon said casing, a plunger slidably carried by the body and extending into said liquid chamber, whereby upon movement of the plunger liquid is displaced in said chamber to effect corresponding movements of the bellows and compression of said spring, said plunger having its exterior end extending into motion transmitting engagement with said diaphragm.

2. Equipment as in claim 1 together with manually adjustable means for varying the volume of the liquid chamber.

3. Equipment as in claim 1 in which a sleeve surrounds the plunger and is removably carried by the body, whereby the plunger and the sleeve can be removed from the body as a unitary assembly to enable application of plungers of different cross-sectional areas.

RICHARD M. WITT.

REFERENCES CITED

The following references are of record in the file of this patent:

UNITED STATES PATENTS

| Number | Name | Date |
|---|---|---|
| 2,226,821 | Kempson | Dec. 31, 1941 |
| 2,299,824 | Kalin | Oct. 27, 1942 |
| 2,303,752 | Meredith | Dec. 1, 1942 |
| 2,353,692 | Cunningham | July 18, 1944 |
| 2,372,014 | Rockwell | Mar. 20, 1045 |
| 2,372,345 | Temple | Mar. 27, 1945 |
| 2,382,941 | Moore | Aug. 14, 1945 |